March 31, 1964 K. HINTZE 3,126,803
FILM WINDING APPARATUS FOR A PHOTOGRAPHIC CAMERA
Filed Nov. 30, 1960
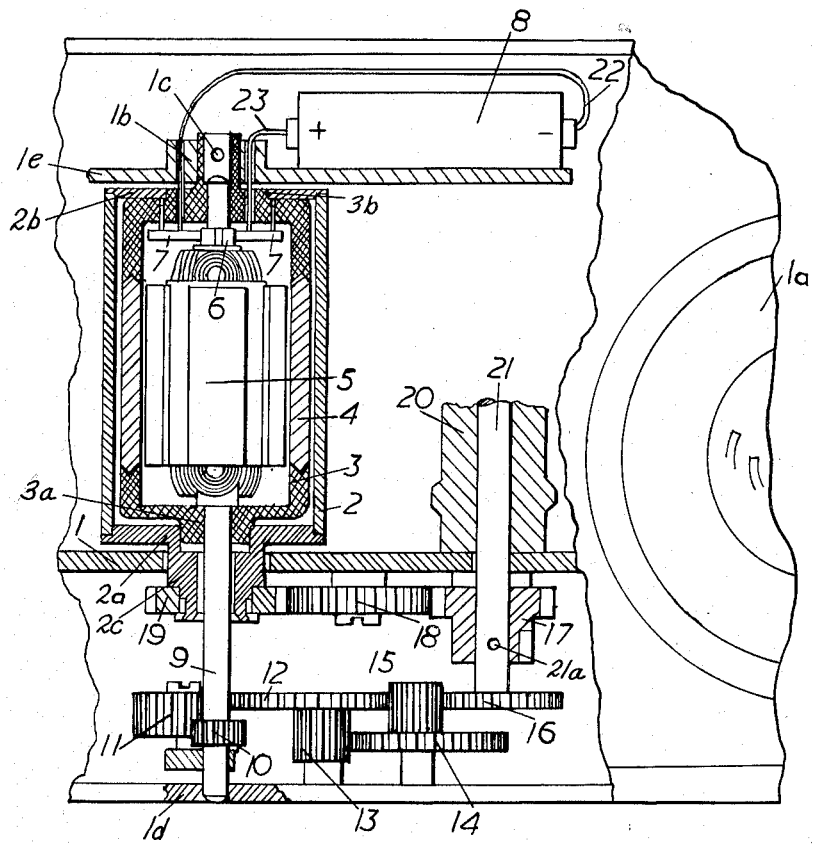
Inventor
KLAUS HINTZE
By Irwin S. Thompson
Attorney

3,126,803
FILM WINDING APPARATUS FOR A PHOTOGRAPHIC CAMERA
Klaus Hintze, Dresden, Germany, assignor to VEB Kamera- und Kinowerke Dresden, Dresden, Germany
Filed Nov. 30, 1960, Ser. No. 72,651
3 Claims. (Cl. 95—31)

The invention concerns a photographic camera having an electric motor installed in the film take-up spool to effect film winding, the cocking of the shutter and possibly the other movements which prepare the camera for picture taking.

In order to avoid the inconvenient camera dimensions where built-in electric motors are used, it has already been proposed to house an electric motor in the interior of the film take-up spool of photographic cameras. This solution, already known from the installation of spring motors, became especially advantageous for the installation of electric motors due to the fact that it was proposed to mount the housing of the electric motor rotatably and construct it as film take-up spool, which is driven through a reduction gearing by the rotor shaft of the electric motor. In this manner the unused internal space of the film take-up spool was advantageously utilised, without unfavourably influencing the external dimensions of the camera.

However, this construction has a decisive disadvantage. The rotatable mounting of the motor housing requires the arrangement of slip rings for the current supply for the contact brushes of the commutator in the electric motor housing. The contact resistances occurring between these slip rings and the slip contacts fixedly arranged on the camera housing, especially in the case of infrequent use, can become so great that sensitive disturbances in the current supply reduce the power of the motor until it is incapable of operating. This danger is favoured due to the fact that the lower speed of revolution with which the motor housing rotates hardly offers a possibility for the self cleaning of the slip contacts and the contact path on the slip rings.

The invention removes this disadvantage and achieves further advantages due to the fact that it constructs the return ring of the electric motor as a film take-up spool, arranges it rotatably about a stationary stator and gears it with the rotor of the electric motor through a reduction gearing of a style known per se. Due to this separation in accordance with the invention of the return ring necessary for the economic design of the motor efficiency from the stator containing the permanent field magnets and equivalent space utilisation is achieved with simultaneous exclusion of the stated disadvantages of the constructions known hitherto. A further advantage of the construction in accordance with the invention resides in the economic production of the electric motors thereby rendered possible. The rotor is enclosed in accordance with the invention by a synthetic plastic housing with permanent magnets embedded therein, which thus forms a stator which is as simple as possible in construction and production.

Now a possible form of embodiment of the invention is to be explained hereinafter by reference to an example, from which further features peculiar thereto may be seen. Here all details have been avoided which are not directly connected with the invention.

The figure shows the gear arrangement of a camera equipped in accordance with the invention, partially in section.

The electric motor comprises a stator 3 fixed on an upper plate 1e of the camera housing 1 in a flange 1b thereof for example by means of a pin 1c, which stator 3 is composed of a synthetic plastic housing having permanent magnets 4 embedded therein. Within the stationary stator 3 there is arranged a rotor 5, fixedly mounted on a shaft 9 which in turn is rotatably mounted in the stator housing 3 and also in a bottom plate 1d. Around the stator 3, there is rotatably mounted a return ring 2 constructed as film take-up spool, which is rotatably supported at each of its two ends 2a, 2b on bearing collars 3a, 3b of the stator 3.

From a current source, for example a battery 8, the current is conducted through the two cables 22, 23, which pass through openings in the upper plate and the upper end 3b of the stator 3, to the two brushes 7, and the rotor 5 is thereby set in rotation, through the commutator 6. A toothed pinion 10 is rigidly connected to the shaft 9, of the rotor and is drivably connected to a shaft 21 which carries the film winding sprocket 20, by means of geared spur wheels 11, 12, 13, 14, 15, 16. A toothed wheel 17 is connected to the shaft 21 by means of a pin 21a, and drives a toothed wheel 19 over an intermediate wheel 18. The wheel 19 is secured on a collar 2c integrally formed with the end 2a of the return ring 2. Thus at the same time the return ring 2 serving as film take-up spool receives its rotational movement for the taking-up of the film.

In accordance with the invention, as shown in the drawing, in the synthetic plastic housing of the stator 3, there are embedded the permanent magnets 4 in such fashion that even the outermost of the magnet surfaces disposed adjacent the film spool 2 are completely free from the plastic material. The magnets are the same thickness as the radial thickness of the housing. The permanent magnets 4 which accordingly lie free on both sides are preferably provided with pointed edges surrounded by the synthetic plastic housing and are thereby held in reliable fashion. Due to the nature of the construction in accordance with the invention the spacing between the outer surfaces of the permanent magnets 4 and the film spool can be kept small.

The term "return ring" used above means a ring which returns the magnetic lines of force and completes the magnetic circuit of the motor and is more commonly referred to as a magnet yoke.

I claim:
1. A film winding apparatus for a photographic camera comprising a support member for mounting within the camera an electric motor having a stator fixed to said support member, and a rotor mounted on said member so as to be rotatable within said stator, a magnet yoke forming a film take-up cylinder rotatably mounted on the support member and surrounding said stator, a gear-train drivably connected between the rotor and the film take-up cylinder, a shaft drivably connected to one of the gear wheels of said train, and a film winding sprocket supported on said shaft to be driven simultaneously with said film take-up cylinder on operation of the electric motor.

2. A film winding apparatus according to claim 1, wherein the stator comprises a cylindrical housing made of a synthetic plastic material and a series of permanent magnets embedded therein.

3. A film winding apparatus according to claim 2 wherein the ends of the permanent magnets are pointed to facilitate support of the magnets in the housing, said magnets having a thickness equal to the radial thickness of the housing whereby the inner and outer surfaces of the magnets are not covered by the plastic material.

References Cited in the file of this patent

German application 1,027,981, printed Apr. 10, 1958.
German application 1,047,008, printed Dec. 18, 1958.
German application 1,059,762, printed June 18, 1959.